United States Patent
Russom et al.

(10) Patent No.: US 7,410,120 B2
(45) Date of Patent: Aug. 12, 2008

(54) CONTROL SURFACE ASSEMBLIES WITH TORQUE TUBE BASE

(75) Inventors: Jeffery D. Russom, Chesterfield, MO (US); Lawrence R. White, Florissant, MO (US); James Greenwood, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 11/043,918

(22) Filed: Jan. 21, 2005

(65) Prior Publication Data

US 2006/0163435 A1  Jul. 27, 2006

(51) Int. Cl.
  *B64C 1/26* (2006.01)
  *B64C 5/06* (2006.01)
  *B64C 5/02* (2006.01)

(52) U.S. Cl. .................. 244/3.24; 244/91; 244/131

(58) Field of Classification Search ........... 244/91, 244/87, 130, 131, 3.24
See application file for complete search history.

(56) References Cited

U.S. PATENT DOCUMENTS

| | | | | |
|---|---|---|---|---|
| 1,246,027 A | * | 11/1917 | Kleckler | 244/131 |
| 1,322,868 A | * | 11/1919 | Behncke | 403/54 |
| 1,676,231 A | * | 7/1928 | Powell | 244/130 |
| 1,780,812 A | * | 11/1930 | Burnelli | 244/131 |
| 2,353,856 A | * | 7/1944 | Shannon | 244/87 |
| 2,382,358 A | * | 8/1945 | Watter | 244/131 |
| 3,004,645 A | * | 10/1961 | Moul, Jr. | 244/131 |
| 3,219,158 A | * | 11/1965 | Carter et al. | 52/84 |
| 3,223,034 A | * | 12/1965 | Robertson | 244/3.24 |
| 3,618,877 A | * | 11/1971 | Peters | 244/55 |
| 3,648,953 A | | 3/1972 | Polk, Jr. | |
| 3,666,211 A | * | 5/1972 | Cathers et al. | 244/54 |
| 3,942,747 A | * | 3/1976 | Wolkovitch | 244/13 |
| 4,167,430 A | | 9/1979 | Arachi | |
| 4,190,219 A | * | 2/1980 | Hackett | 244/199.4 |
| 4,373,689 A | * | 2/1983 | Walker | 244/87 |
| 4,738,412 A | | 4/1988 | Ozunas | |
| 4,795,110 A | | 1/1989 | Lang | |
| 4,813,202 A | * | 3/1989 | Anderson | 52/281 |

(Continued)

FOREIGN PATENT DOCUMENTS

JP  06026799  4/1994

OTHER PUBLICATIONS

PCT International Search Report and Written Opinion for Application No. PCT/US2006/001601, dated Jul. 4, 2006, 13 pages.

*Primary Examiner*—Rob Swiatek
(74) *Attorney, Agent, or Firm*—Lee & Hayes, PLLC

(57) ABSTRACT

Control surface assemblies having a torque tube base are disclosed. In one embodiment, a control surface assembly includes a control surface portion and a base portion. The base portion has a hollow, shell-like base portion coupled to a first end portion of the control surface portion, and is adapted to be coupled to a supporting structure such that the control surface portion projects outwardly from the supporting structure. In one aspect, the base portion includes an elongated, closed section portion adapted to be coupled to the supporting structure. In a further aspect, the base portion includes an elongated, closed section portion adapted to be coupled to the supporting structure, and a pair of tapered end portions formed at opposing ends of the closed section portion.

12 Claims, 3 Drawing Sheets

U.S. PATENT DOCUMENTS

| | | | |
|---|---|---|---|
| 4,828,203 A * | 5/1989 | Clifton et al. | 244/12.3 |
| 4,860,969 A | 8/1989 | Muller et al. | |
| 4,936,525 A | 6/1990 | Daffix et al. | |
| 5,114,095 A | 5/1992 | Schroppel et al. | |
| 5,127,605 A | 7/1992 | Atchison et al. | |
| 5,192,037 A | 3/1993 | Moorefield | |
| 5,409,185 A | 4/1995 | Oldakowski | |
| 5,504,408 A | 4/1996 | Tu et al. | |
| 5,651,516 A * | 7/1997 | Mihora et al. | 244/204 |
| 5,904,319 A | 5/1999 | Hetzer | |
| 5,950,963 A | 9/1999 | Speicher et al. | |
| 6,042,059 A * | 3/2000 | Bilanin et al. | 244/199.1 |
| 6,116,540 A * | 9/2000 | Arata | 244/87 |
| 6,224,013 B1 | 5/2001 | Chisolm | |
| 6,250,584 B1 | 6/2001 | Hsu et al. | |
| 6,315,240 B1 * | 11/2001 | Rasmussen et al. | 244/3.24 |
| 6,345,790 B1 * | 2/2002 | Brix | 244/199.4 |
| 6,352,217 B1 | 3/2002 | Hsu et al. | |

* cited by examiner

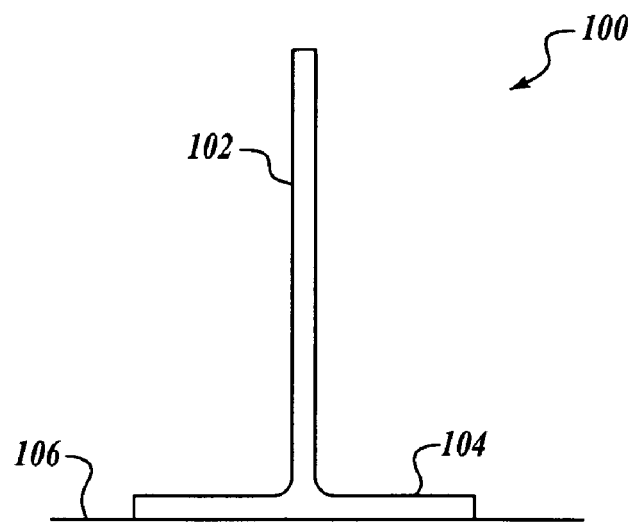
FIG. 1 *(PRIOR ART)*
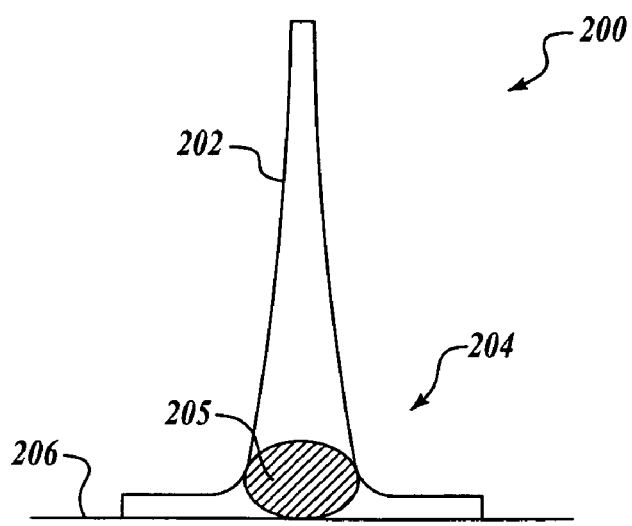
FIG. 2 *(PRIOR ART)*

CONTROL SURFACE ASSEMBLIES WITH TORQUE TUBE BASE

GOVERNMENT LICENSE RIGHTS

This invention was made with Government support under U.S. Government contract F33615-98-9-2880 awarded by United States Air Force. The Government has certain rights in this invention.

FIELD OF THE INVENTION

This invention relates to structures for flight vehicles, and more specifically, to control surface assemblies having a torque tube base.

BACKGROUND OF THE INVENTION

Many types of aerospace vehicles include one or more control surfaces that project outwardly from a main body of the vehicle to enhance or to enable proper control of the vehicle. Typically, such control surfaces are designed to meet anticipated load requirements associated with control of the vehicle. Among the considerations involved in the design of such control surfaces is the stiffness of the control surface to avoid flutter. More specifically, to avoid flutter of a control surface (e.g. a control fin) it is typically necessary to increase the fundamental mode shape frequencies.

For example, FIGS. 1 and 2 show simplified cross-sectional views of control surface assemblies in accordance with the prior art. In FIG. 1, a control surface assembly 100 includes an outwardly-projecting control surface portion 102 coupled to a flat flange portion 104 that attaches to an aerospace vehicle 106 (e.g. a missile, an aircraft, etc.). Typically, the control surface assembly 100 is efficient in bending stiffness, but is relatively less efficient in providing torsional stiffness. In FIG. 2, a control surface assembly 200 includes a non-uniformly tapered outwardly-projecting control surface portion 202 coupled to a base portion 204 having a solid support member 205. The base portion 204 is coupled to a fuselage (or body) 206. The control surface assembly 200 is typically less efficient in bending stiffness than the control surface assembly 100 having the flat flange portion 104 however, the control surface assembly 200 may exhibit improved torsional stiffness over the control surface assembly 100 due to the stiffness of the solid support member 205.

Although desirable results have been achieved using the prior art control surface assemblies shown in FIGS. 1 and 2, there may be room for improvement. For example, for at least some applications, the prior art assemblies may exhibit undesirable weight and heat transfer characteristics. Therefore, improved control surface assemblies that at least partially mitigate these undesirable characteristics would have utility.

SUMMARY OF THE INVENTION

The present invention is directed to control surface assemblies having a torque tube base. Embodiments of the present invention may advantageously provide a desired degree of bending and torsional stiffness, with improved weight and heat transfer characteristics in comparison with the prior art.

In one embodiment, a control surface assembly includes a control surface portion and a base portion. The base portion has a hollow, shell-like base portion coupled to a first end portion of the control surface portion, and is adapted to be coupled to a supporting structure such that the control surface portion projects outwardly from the supporting structure. In one aspect, the base portion includes an elongated, closed section portion adapted to be coupled to the supporting structure. In a further aspect, the base portion includes an elongated, closed section portion adapted to be coupled to the supporting structure, and a pair of tapered end portions formed at opposing ends of the closed section portion.

BRIEF DESCRIPTION OF THE DRAWINGS

Preferred and alternate embodiments of the present invention are described in detail below with reference to the following drawings.

FIG. 1 is an end cross-sectional schematic view of a control surface assembly in accordance with the prior art;

FIG. 2 is an end cross-sectional schematic view of another control surface assembly in accordance with the prior art;

DETAILED DESCRIPTION

The present invention relates to control surface assemblies having a torque tube base. Many specific details of certain embodiments of the invention are set forth in the following description and in FIGS. 1-6 to provide a thorough understanding of such embodiments. One skilled in the art, however, will understand that the present invention may have additional embodiments, or that the present invention may be practiced without several of the details described in the following description.

Figure 3:
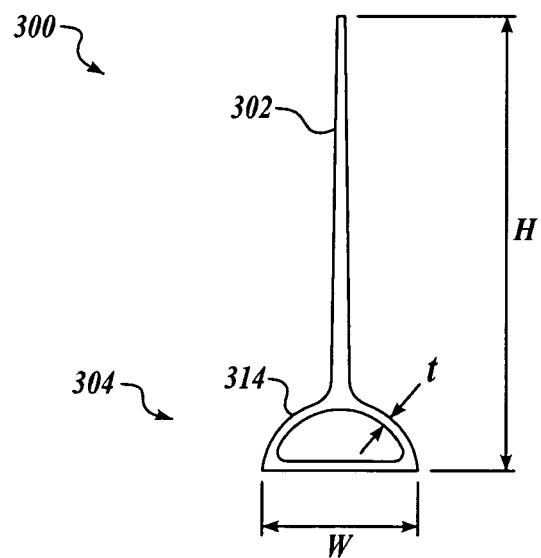
FIG. 3 is an end cross-sectional view of a control surface assembly in accordance with an embodiment of the present invention.
Figure 4:
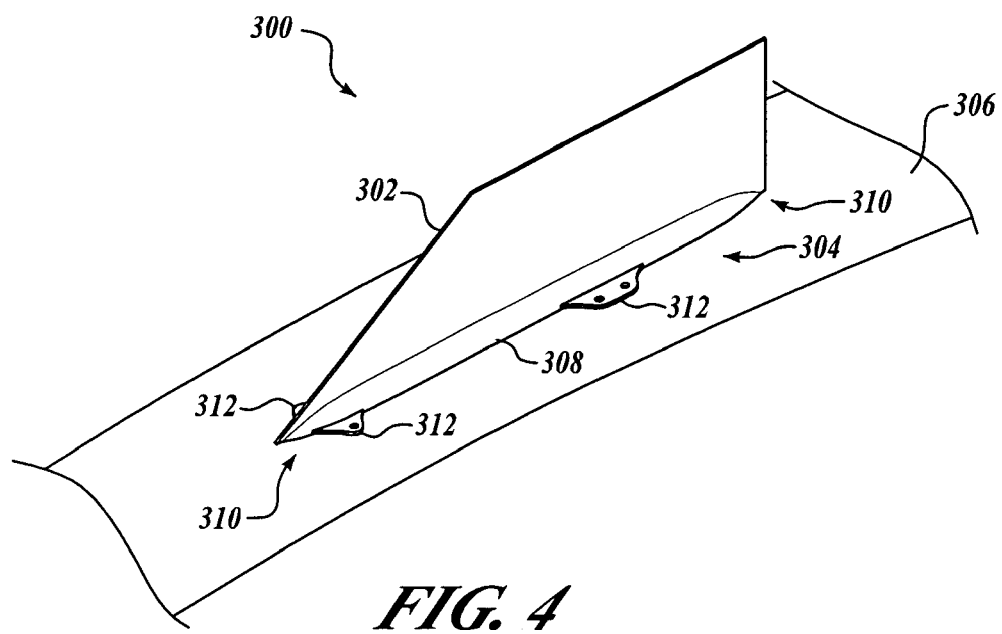
FIG. 4 is an isometric view of the control surface assembly of FIG. 3 coupled to a vehicle in accordance with another embodiment of the invention.

FIG. 3 is an end cross-sectional view of a control surface assembly 300 in accordance with an embodiment of the present invention. FIG. 4 is an isometric view of the control surface assembly 300 of FIG. 3 coupled to a vehicle fuselage 306. In this embodiment, the control surface assembly 300 includes an outwardly-projecting control surface portion 302 coupled to a hollow, shell-like base portion 304 having a thickness t. The outwardly-projecting control surface portion 302 may be tapered (uniformly or non-uniformly) as shown in FIG. 3, or alternately, may be of uniform thickness or width, or any other suitable combination thereof.

In one embodiment, the base portion 304 includes a rounded (or arcuate) member 314 (FIG. 3) that forms a substantially hollow (or tubular) section. In some embodiments, the rounded member 314 may have a semi-circular (or partially semi-circular) cross-sectional shape, and may be completely enclosed, as shown in FIG. 3, or alternately, it may be only partially closed. As best shown in FIG. 4, the rounded member 314 comprises an elongated main portion 308 having a pair of tapered end portions 310. The base portion 304 further includes a plurality of attachment flanges 312 for coupling the base portion 304 to the aircraft 306. The control surface portion 302 is coupled to the rounded member 314 and projects outwardly from the fuselage 306 by a height H. As further shown in FIG. 3, the base portion 304 has a width W.

Figure 5:
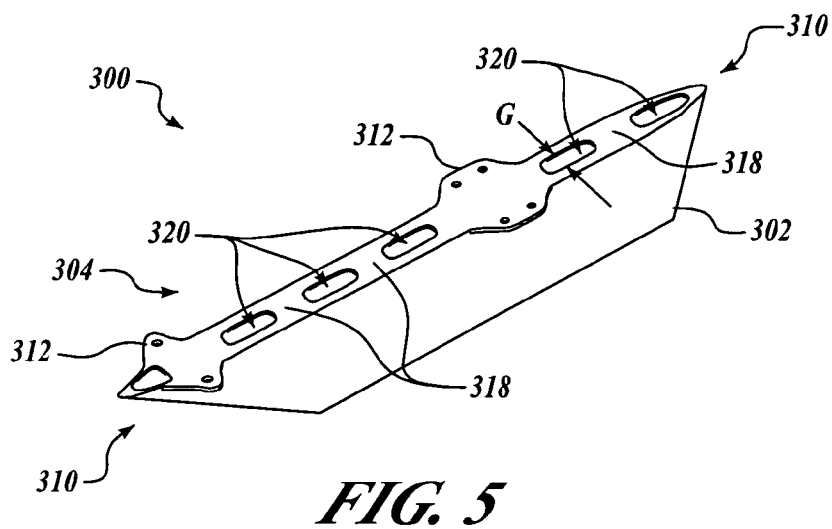
FIG. 5 is an isometric view of the control surface assembly of FIG. 3 in an inverted position.

FIG. 5 is an isometric view of the control surface assembly 300 of FIG. 3 in an inverted position. As shown in FIG. 5, the base portion 304 may further include a plurality of span members 318 that span between opposing lateral sides of the rounded member 314, and which are formed between a plurality of gaps 320 having a gap width G. In this embodiment, the base portion 304 includes multiple attachment flanges 312 suitable for fixed aero-surface configurations such as strakes or fences. In alternate embodiments, the base portion 304 may include only a single attachment point, such as for rotating control surface configurations.

In operation, the control surface assembly 300 provides increased fundamental mode shape frequencies to avoid flutter. Because the base portion 304 of the control surface assembly 300 is a hollow, shell-like structure, the base portion 304 advantageously provides suitable torsional stiffness characteristics by increasing the frequency of multiple mode shapes (e.g. plate bending and plate torsion) while also providing improved weight characteristics. In one particular aspect, the substantially-hollow main portion 308 may provide a highly efficient structure for meeting the desired torsional stiffness characteristics. In addition, the hollow base portion 304 may provide suitable bending stiffness.

In some embodiments, the base portion 304 of the control surface assembly 300 may provide a substantial weight savings over comparable prior art assemblies. In one particular embodiment, for example, a 30% or higher weight savings may be achieved. Substantial weight savings may be achievable for both metal and composite control surface assemblies. Furthermore, for high temperature applications, the base portion torque tube feature between the attach points, allows a reduced amount of contact area required for attachment. This may advantageously reduce or minimize the amount of heat transfer from the control surface portion 302 into the fuselage 306 compared with prior art apparatus.

For applications that require enhanced stiffness of control surface assemblies, prior art methods of adding bending stiffness included simply thickening the outwardly-projecting portion and the base portion. It has been determined, however, that there is a point of diminishing returns for blade thickening because the added mass offsets the increased blade/plate bending stiffness. Furthermore, in one particular embodiment, the hollowed base portion 304 of the control surface assembly 300 provides a lowest natural frequency of a plate bending mode of approximately 120 Hz, and approximately 150 Hz for a first plate torsion mode, as compared with a lowest natural frequency of 60 Hz for the plate bending mode and approximately 90 Hz for the first plate torsional mode for the flat flange 104 of the assembly 100 shown in FIG. 1. These data demonstrate that embodiments of the invention may simultaneously increase the frequency of multiple mode shapes. Furthermore, the control surface assembly 300 may be substantially lighter than the flat flange assembly 100 of the prior art.

Figure 6:
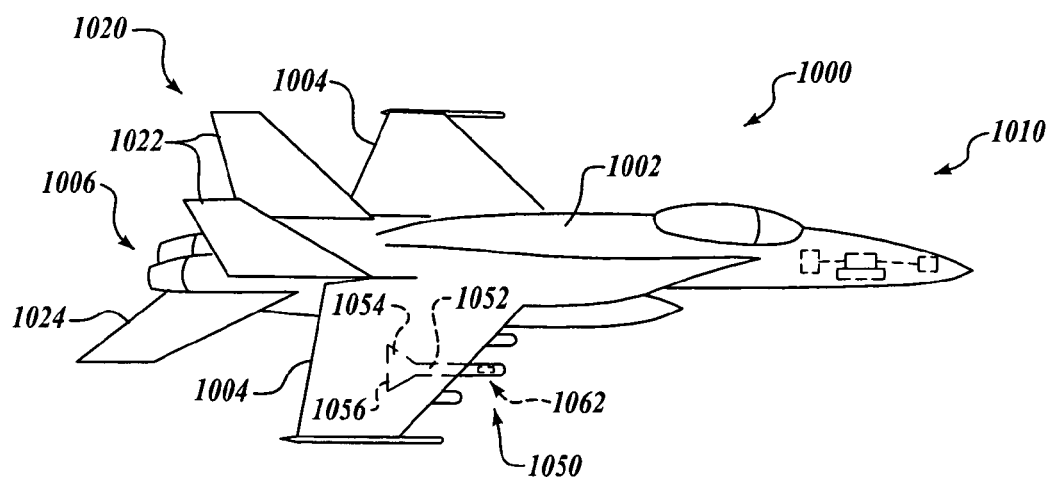
FIG. 6 is an isometric view of an aircraft having a plurality of missiles in accordance with further embodiments of the present invention.

It will be appreciated that control surface assemblies in accordance with the present invention may be used on a variety of vehicles and systems, including but not limited to any suitable type of aerospace vehicles. For example, FIG. 6 is an isometric view of an aircraft 1000 having a plurality of missiles 1050 in accordance with further embodiments of the present invention. The aircraft 1000 includes a variety of known components, including a fuselage 1002, lift generating surfaces 1004 (e.g. wings), a propulsion system 1006, a control system 1010, and a host of other systems and subsystems that enable proper operation of the aircraft 1000. The aircraft 1000 also includes a tail assembly 1020 having a pair of vertical fins 1022 and a pair of horizontal fins 1024 (only one visible). The fins 1022, 1024 may suitably be control surface assemblies in accordance with embodiments of the present invention.

In addition, each of the missiles 1050 may include a variety of known components, including a fuselage 1052, a plurality of control surfaces (or fins or strakes) 1054 coupled to the fuselage 1052, a propulsion system 1056, a control system 1062, and other systems and subsystems that enable proper operation of the missile 1050. Each of the control surfaces 1060 may suitably be control surface assemblies in accordance with embodiments of the present invention.

In one embodiment, the aircraft 1000 may be a fighter aircraft, such as, for example, an F/A-18E Super Hornet manufactured by The Boeing Company of Chicago, Ill. However, it will be appreciated that embodiments of control surface assemblies in accordance with the present invention may be included in any other suitable aircraft. For example, in alternate embodiments, the aircraft may be a fighter aircraft, a rotary aircraft, a bomber aircraft, or any other suitable type of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. Similarly, the missiles 1050 may be any suitable type of missiles that include a movable or non-movable control surface assemblies, including but not limited to Harpoons, HARMs, Sparrows, AMRAAMs, or any other suitable missiles, including those described in the above-referenced texts.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A control surface assembly, comprising:
   a control surface portion having a pair of longitudinal surfaces; and
   a hollow base portion coupled to a first end portion of the control surface portion, the base portion including:
   an elongated curved wall; and
   an elongated base plate disposed crosswise to the pair of the longitudinal surfaces, the elongated base plate having at least one aperture disposed therein, and said base plate having a plurality of attachment flanges extending laterally outwardly beyond the longitudinal surfaces, the attachment flanges being configured to be coupled to a supporting structure such that the control surface portion projects outwardly from the supporting structure.

2. The assembly of claim 1, wherein the elongated curved wall and the elongated base plate cooperatively define a hollow region, and the control surface portion projects from the elongated curved wall.

3. The assembly of claim 2, wherein the hollow region has a semi-circular cross-sectional shape.

4. The assembly of claim 1, wherein the base portion includes a pair of tapered end portions formed at opposing ends of the base portion.

5. The assembly of claim 1, wherein the at least one aperture disposed in the base plate includes a plurality of apertures.

6. The assembly of claim 1, wherein the at least one aperture disposed in the elongated base plate includes a plurality of elongated apertures, the base plate further including at least one span member extending laterally between the plurality of apertures.

7. A vehicle, comprising:

a fuselage; and a control surface assembly coupled to the fuselage, the control surface assembly including:

a control surface portion having a pair of longitudinal surfaces; and a hollow base portion coupled to a first end portion of the control surface portion, the base portion including:

an elongated curved wall; and an elongated base plate disposed crosswise to the pair of the longitudinal surfaces, the elongated base plate having at least one aperture disposed therein, and said base plate having a plurality of attachment flanges extending laterally outwardly beyond the longitudinal surfaces, the attachment flanges being coupled to the fuselage such that the control surface portion projects outwardly from the fuselage.

8. The vehicle of claim 7, wherein the elongated curved wall and the elongated base plate cooperatively define a hollow region, and the control surface portion projects from the elongated curved wall.

9. The vehicle of claim 8, wherein the hollow region has a semi-circular cross-sectional shape.

10. The vehicle of claim 7, wherein the base portion includes a pair of tapered end portions formed at opposing ends of the base portion.

11. The vehicle of claim 7, wherein the at least one aperture disposed in the base portion includes a plurality of apertures.

12. The vehicle of claim 7, wherein the at least one aperture disposed in the elongated base plate includes a plurality of elongated apertures, the base plate further including at least one span member extending laterally between the plurality of apertures.

* * * * *